(12) United States Patent
Altevogt et al.

(10) Patent No.: US 7,765,214 B2
(45) Date of Patent: Jul. 27, 2010

(54) ENHANCING QUERY PERFORMANCE OF SEARCH ENGINES USING LEXICAL AFFINITIES

(75) Inventors: Peter Altevogt, Ettlingen (DE); Marcus Felipe Fontoura, San Jose, CA (US); Silvio Wiedrich, London (GB); Jason Yeong Zien, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 11/335,760

(22) Filed: Jan. 18, 2006

(65) Prior Publication Data

US 2006/0259482 A1    Nov. 16, 2006

(30) Foreign Application Priority Data

May 10, 2005   (EP)   ................. 05103880

(51) Int. Cl.
    *G06F 7/00*    (2006.01)
(52) U.S. Cl. ...................................... 707/742
(58) Field of Classification Search .............. 707/104.1
    See application file for complete search history.

(56) References Cited

U.S. PATENT DOCUMENTS

| | | | | |
|---|---|---|---|---|
| 5,392,447 | A | * | 2/1995 | Schlack et al. ............. 715/863 |
| 5,488,725 | A | * | 1/1996 | Turtle et al. ................... 707/5 |
| 5,781,660 | A | * | 7/1998 | Nitta et al. ................. 382/177 |
| 6,070,158 | A | * | 5/2000 | Kirsch et al. .................. 707/3 |
| 6,349,308 | B1 | * | 2/2002 | Whang et al. ............ 707/103 Z |
| 6,940,852 | B1 | * | 9/2005 | Washburn .................. 370/389 |
| 7,149,748 | B1 | * | 12/2006 | Stephan ..................... 707/102 |
| 2003/0078913 | A1 | * | 4/2003 | McGreevy ..................... 707/3 |
| 2004/0158580 | A1 | * | 8/2004 | Carmel et al. ............ 707/104.1 |
| 2005/0234952 | A1 | * | 10/2005 | Zeng et al. ................. 707/101 |
| 2006/0018551 | A1 | * | 1/2006 | Patterson .................... 382/229 |

(Continued)

FOREIGN PATENT DOCUMENTS

WO          00/62155          10/2000

(Continued)

OTHER PUBLICATIONS

Bahle, D., H.E. Williams, and J. Zobel, "Efficient Phrase Querying with an Auxiliary Index", Proceedings of the 25th Annual International ACM SIGIR Conference on Research and Development in Information Retrieval, 2002, pp. 215-221.

(Continued)

*Primary Examiner*—Tony Mahmoudi
*Assistant Examiner*—Jensen Hu
(74) *Attorney, Agent, or Firm*—Janaki K. Davda; Konrad Raynes & Victor LLP

(57) ABSTRACT

Provided are techniques for computer-based electronic Information Retrieval (IR). An extended inverted index structure by generating one or more lexical affinities (LA), wherein each of the one or more lexical affinities comprises two or more search items found in proximity in one or more documents in a pool of documents, and generating a posting list for each of the one or more lexical affinities, wherein each posting list is associated with a specific lexical affinity and contains document identifying information for each of the one or more documents in the pool that contains the specific lexical affinity and a location within the document where the specific lexical affinity occurs.

28 Claims, 7 Drawing Sheets

EXTENDED INVERTED INDEX

U.S. PATENT DOCUMENTS

2006/0259482 A1* 11/2006 Altevogt et al. ............... 707/5

OTHER PUBLICATIONS

Durand, M., "A Probabilistic Counting Algorithm", Algorithms Seminar 2002-2004, [online], Dec. 9, 2002, [retrieved on Mar. 27, 2007], retrieved from the Internet at <URL: http://algo.inria.fr/seminars/summary/durand2002.pdf>., pp. 93-96.

European Search Report, Apr. 11, 2007, for European Application No. EP 06111673.

Maarek, Y.S., and F.A. Smadja, "Full Text Indexing Based on Lexical Relations an Application: Software Libraries", Proceedings of the 12th Annual International ACM SIGIR Conference on Research and Development in Information Retrieval, 1989, pp. 198-206.

Arasu, A., J. Cho, H. Garcia-Molina, A. Paepcke. and S. Raghavan, "Searching the Web", 2000; pp. 1-42.

Baeza-Yates, R. and B. Ribeiro-Neto, *Modern Information Retrieval*, ACM Press, New York, 1994.

Debowski, L., "Statistical Tests for Detection of Collocations", Oct. 2000, pp. 1-7.

Kirschenhofer, P. and H. Prodinger, "Approximate Counting: An Alternative Approach", *RAIRO Theoretical Informatics and Applications*, 1991, vol. 25, pp. 43-48.

Maarek, Y.S. and D.M. Berry. "The Use of Lexical Affinities in Requirements Extraction", *Proceedings of the* Fifth International Workshop on Software Specification and Design, 1989, pp. 196-202.

Maarek, Y.S. and F.A. Smadja, "Full Text Indexing Based on Lexical Relations an Application: Software Libraries", *Proceedings of the Twelfth Annual International ACM SIGIR Conference on Research and Development in Information Retrieval*, 1989, pp. 198-206.

Manning. C.D., and H. Schutze, *Foundations of Statistical Natural Language Processing*, The MIT Press, Cambridge, Mass., 1999.

Whitten, I.H., A. Moffat, and T.C. Bell, *Managing Gigabytes: Compressing and Indexing Documents and Images*, Second Edition, Morgan Kaufmann Publishers, San Francisco, 1999.

\* cited by examiner

EXTENDED INVERTED INDEX

AT INDEXING TIME

- 310: SCAN DOCUMENT WITH 5-WORD WINDOW; RESULT: ITEM / OCC. SCORE / LOCATIONS
- 320: FILTER NOISE
- 330: GENERATE LEXICAL AFFINITIES (LAs)
- 332: COMPARE SINGLE ITEM TOP SCORER
- 334: RETRIEVE LA-PROPERTY FROM SHORT DISTANCE IN POSTING LIST
- 336: STORE LA TOP SCORER
- 340: INSERT LAs INTO INVERTED INDEX

FIG. 5A

AT QUERY TIME

PRIOR ART:
- 450: RECEIVE QUERY WITH ITEMS XX YY, COMPRISING „AND" OPERATOR
- 455: LOOK UP INVERTED INDEX FOR XX
- 460: LOOK UP INVERTED INDEX FOR YY
- 465: PERFORM „AND"
- 470: DISPLAY RANKED DOCUMENT LIST

INVENTIONAL:
- 350: RECEIVE QUERY COMPRISING AN LA
- 355: LOOK UP EXTENDED INVERTED INDEX DIRECTLY FOR LA
- 370: DISPLAY RANKED DOCUMENT LIST

FIG. 5B

| Counter value | Probability of increment |
|---:|---:|
| 1 | 0,5 |
| 2 | 0,25 |
| 3 | 0,125 |
| 4 | 0,0625 |
| 5 | 0,03125 |
| 6 | 0,015625 |
| 7 | 0,0078125 |
| 8 | 0,00390625 |
| 9 | 0,001953125 |
| 10 | 0,000976563 |
| 11 | 0,000488281 |
| 12 | 0,000244141 |
| 13 | 0,00012207 |
| 14 | 6,10352E-05 |
| 15 | 3,05176E-05 |
| 16 | 1,52588E-05 |
| 17 | 7,62939E-06 |
| 18 | 3,8147E-06 |
| 19 | 1,90735E-06 |
| 20 | 9,53674E-07 |
| 21 | 4,76837E-07 |

FIG. 6

| Original counting N | Approximate Counting C |
|---:|---:|
| 2 | 2 |
| 7 | 3 |
| 26 | 4 |
| 57 | 5 |
| 71 | 6 |
| 253 | 7 |
| 418 | 8 |
| 848 | 9 |
| 896 | 10 |
| 1.526 | 11 |
| 3.299 | 12 |
| 9.364 | 13 |
| 21.875 | 14 |
| 26.173 | 15 |
| 79.949 | 16 |
| 164.378 | 17 |
| 201.936 | 18 |
| 276.268 | 19 |
| 526.064 | 20 |
| 3.911.089 | 21 |
| 4.079.347 | 22 |
| 4.513.835 | 23 |
| 10.808.861 | 24 |
| 15.537.293 | 25 |
| 17.484.116 | 26 |
| 27.656.205 | 27 |
| 53.163.848 | 28 |
| 175.466.675 | 29 |
| 448.652.160 | 30 |

FIG. 7

ENHANCING QUERY PERFORMANCE OF SEARCH ENGINES USING LEXICAL AFFINITIES

CROSS-REFERENCE TO RELATED FOREIGN APPLICATION

This application claims priority benefits under Title 35, United States Code, Section 119(a)-(d) or Section 365(b) of European Patent Application No. 05103880.0, filed on May 10, 2005, by Dr. Peter Altevogt, et al., and entitled "A Method to enhance Query Performance of Search Engines using Lexical Affinities", which application is incorporated herein by reference in its entirety.

BACKGROUND OF THE INVENTION

1. Field of the Invention

The present invention relates to computer-based electronic Information Retrieval (IR). In particular, it relates to an electronic Information Retrieval (IR) method and system, having an indexer module using an inverted index comprising potential search items and associated posting lists.

2. Description and Disadvantages of Prior Art

The basic structure and function of prior art IR systems is illustrated in FIG. 1.

The system includes amongst other elements with minor relevance for the present invention a search engine comprising a web crawler module 10, a parser or tokenizer module 12, an indexer module 14, an index storage 16 storing data according to a logical scheme comprising search items as mentioned above; the system further includes a ranking module 18, a search module 20, and finally a client which issues queries and receives results from the IR system.

In particular, a search pool of documents (Internet or others) is crawled independently of user queries, and crawled documents are indexed by a data structure, for instance the before-mentioned "inverted index", comprising in each row an index entry composed of a potential search item and an associated posting list containing document-identifying information, saying in which document a search item is found and including optionally further information on the location within a respective document, where said search item occurs. The search server 20 accesses a copy of the index 16, see the arrow.

FIG. 2 depicts a "sectional" view on two single entries within the before-mentioned inverted index data structure. The left column defines the so-called vocabulary and comprises possible search items 22 like for example "IBM", or "SERVER". The right column is known as posting list 24. A posting list entry 26 for a search item includes:
a) a document-identifying information, for example a number, or URL and optionally further information like
b) an offset from the beginning of a respective document.

For "IBM" for example the first entry in the posting list relates to document ID 0003, page 52 thereof and line 13 thereof. The other references and entries in the posting list depicted in FIG. 2 are to be interpreted similarly.

With respect to the particular focus of the present invention, a general issue of prior art Information Retrieval (IR) systems as mentioned above is the size of their data structures, e.g. the dictionary or "vocabulary" entries, i.e., the left column in FIG. 2. When data items thereof are too big, the system suffers the drawback of low data cache hit rate and high I/O traffic between the system memory and the CPU forming a well known performance bottleneck. In worst case, the third stage forming part of an even longer and narrower bottleneck is consequently disk input and output (I/O), since count and size of data items can exceed the available hardware-sided memory. IR systems and search engines are used to compute a very large number of particular data items like dictionary entries, posting list entries and statistical information related thereto. So, with increasing use of this bottleneck during the query execution as depicted in FIG. 1 the performance thereof slows down intolerably.

So, basically every approach of shifting resource consumption from the memory and I/O subsystems to the CPU, to avoid intensive bottleneck usage is welcome in general, since CPU speed is increasing at a higher rate than the memory or I/O subsystem bandwidth. One such prior art approach includes the general idea to reduce disk I/O by the compression of the data items in memory before they are written to disk, see I. H. Witten, A. Moffat, T. C. Bell: Managing Gigabytes: Compressing and Indexing Documents and Images, Second Edition, Morgan Kaufmann, Inc. 1999.

But this approach suffers from the drawback that the data must be read back to memory for decompression. This requires additional memory and CPU cycles. This offsets at least partially the savings of disk I/O. Thus, actually this is not a satisfying solution for the bottle-neck problem described above.

OBJECTIVES OF THE INVENTION

It is thus an objective of the present invention to alleviate the before-mentioned disadvantages of prior art.

SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

The term "search pool" of information sources is intended include for example actual plain text documents, but also existing query logs, and "anchor stores" of a document comprising links to the document as they comprise often short and concise content information.

The following characterizing steps of the invention are performed at indexing time:
a) generating an extended inverted index structure comprising
  aa) lexical affinity (LA) pairs, wherein each pair is related to a particular lexical affinity between respective two search items, and
  bb) a respective posting list for each of said LA pairs, and
b) ranking searched documents by using said extended index.

A lexical affinity (LA) represents the correlation of words co-occurring in a document, and is identified by looking at a number of words found in close proximity, for example in a 3-word window, a 4-word- or 5-word, or up to a 10-word window, to each other; for simplicity we limit ourselves here to pairs of words or search items, respectively. The window size is basically subject to free selection.

LAs are identified after prior art noise filtering, preferably by counting the occurrence of textual items preferably having substantial significance in a respective semantic area. The basic prior art approach capable to identify content-relevant single-word search items is thus extended by extending the search items from single-word occurrences to multiple-word, preferable two-word occurrences. For example, "IBM" is a single search item, and "Server" is another single search item. Prior art methods provide for counting the occurrences of either item in a text.

In a further step of the novel method the degree of relevance is defined based on a counting of the number of occurrences of this pair in the document. If quite relevant, what is able to be individually set, and as it is assessed by prior art methods, a loose coupled pair of single search items (LA pair) is directly included as a separate entry into the vocabulary, see the left column of FIG. 2 (prior art), or of FIG. 4 (novel).

With respect to the bottleneck problem mentioned above, the use of LA pairs reduces the uses of the bottleneck significantly, as the entire LA pair is in general residing in memory during query time, and only a minor number of disk I/O processes and minor CPU usage is required for retrieving the posting list of the LA pair from hard disk. A detailed example is given later below.

In the novel method the textual environment of significant search items is further analyzed, preferably in forward and/or backward direction by sliding a scan window through the document. The size of this window can be varied. For example five subsequent words can define a text scan window. During this document scan procedure significant word pairs are identified, which stand repeatedly in a narrow—e.g. five words only—textual distance and thus form a certain "Lexical Affinity", as they describe a semantic context.

This may be used to improve the ranking of the query results so that the more loosely coupled occurrences of search items are included in the result list due to a higher rank score. This is in contrast to prior art methods, which just offer the option of defining a literal text string "XX YY" or the option to search separately for "XX" and then for "YY". When, however, a text string occurs like "XX ZZ YY", thus XX and YY are separated by some characters or some words, then no hit is found in prior art. ZZ can easily be defined over a whole range of "textual distances" from a single character to a couple of words, for instance to 3 words, or 5 words or even 10 words, or any number in-between. Also larger distances can be used, but the longer the distance is the more computing resources must be spent during indexing time.

An instructive example for a Lexical Affinity (LA) pair is:
-IBM Server-

There are plenty of servers offered by IBM, for instance a mail server, a file server, a backup server, etc. As in many texts, further attributes are added, often in the form of a descriptive adjective, for instance, "high-performance" or "high-end" or some product type is interposed like "IBM zSeries Server", etc., all those occurrences are found by the novel method.

Another example is:
-Carnival RIO-

Typical occurrences found by that may look like: "carnival in Rio", or "carnival parties in and around RIO", "carnival high-life in beautiful Rio" etc.

As a skilled reader may understand, this is a major performance and quality gain during search time, as such LA pairs, are able to be ranked relatively high.

Further, these novel steps enhance the ranking procedure. Thus, higher quality ranking results are provided.

A preferred optional feature of the present invention relates to the process of counting these occurrences. In particular, the prior art method of "Probabilistic Counting" (PC) is applied to the counting of the before-mentioned Lexical Affinities, i.e., the entries 42 in FIG. 4 during indexing. This feature allows in this specific use the computing of large numbers within a very small memory region, which are approximately similar to the actual counting result. This increases the probability of cache hits and avoids memory accesses just needed for increasing a counter value, which accelerates the indexing procedure significantly, as the counting, how often a certain term occurs in a given document is a central issue during indexing.

In a second general aspect this invention describes a method to approximately compute statistical data by exploiting probabilistic computations reducing the resource demand concerning memory and disk I/O bandwidth. A direct application of this invention is the counting of term correlations (Lexical Affinities) for ranking.

BRIEF DESCRIPTION OF THE DRAWINGS

The present invention is illustrated by way of example and is not limited by the shape of the figures of the drawings in which:

FIG. 5A is a schematic control flow diagram illustrating the control flow of steps performed during indexing time according to this specific embodiment, FIG. 5B shows the control flow during query time, FIG. 6 shows in a table representation the counter values obtained by probabilistic counting with respective probability values for incrementing the counter, FIG. 7 is a table representation comparing the original counting N in the left column at some specific values and covering a quite large range and respective new values of the counter C obtained by applying the probabilistic counting.

DETAILED DESCRIPTION EMBODIMENTS

Figure 3:
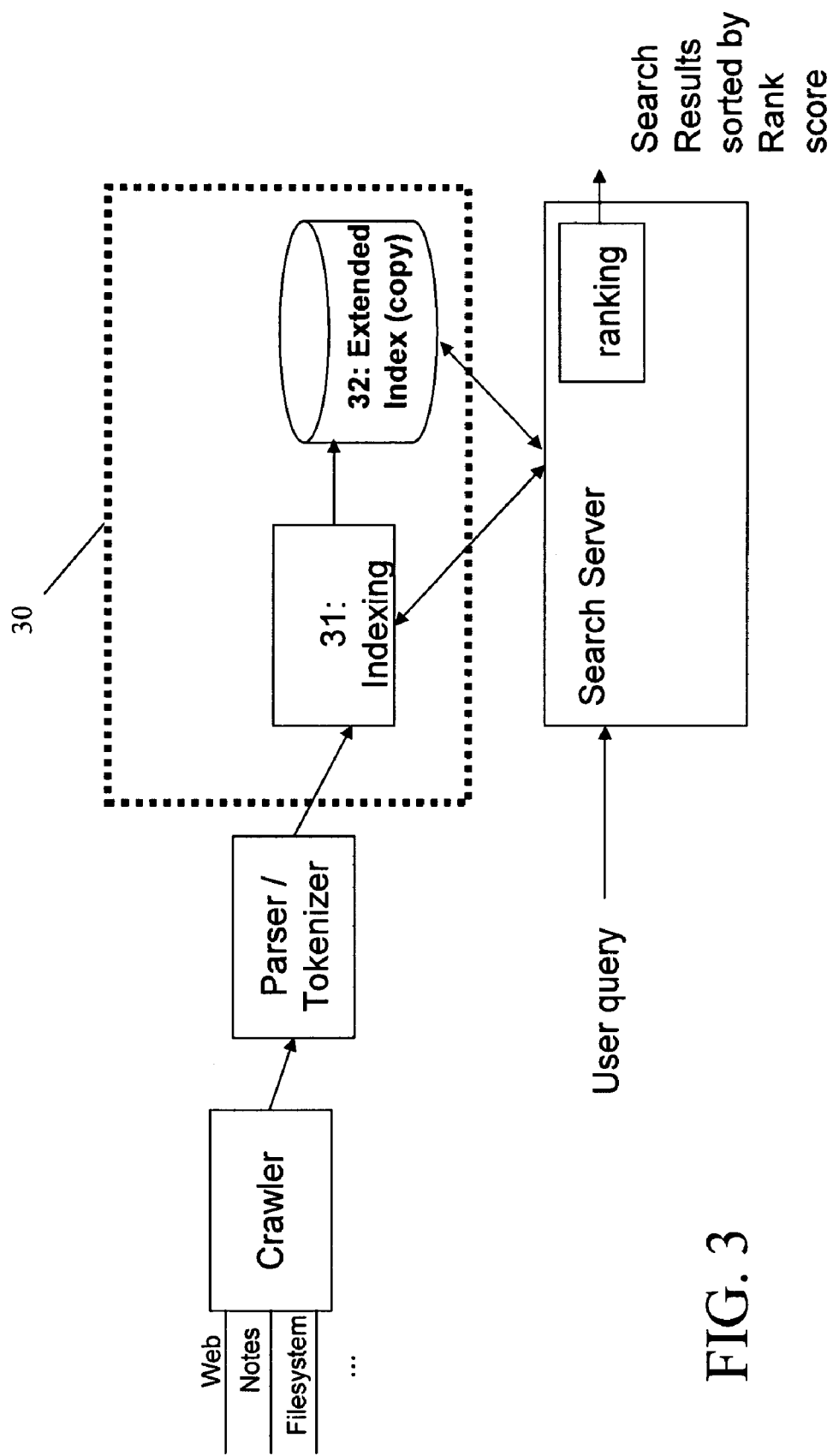
FIG. 3 is a schematic diagram illustrating a system improved by the present invention.

With general reference to the figures and with special reference now to FIG. 3, rectangle 30 is shown which defines the system location for the implementation of the novel method. Indexer 31 uses the method as claimed herein. The extended inverted index 32 obtained by indexer 31 is also used later in the query procedure.

Figure 4:
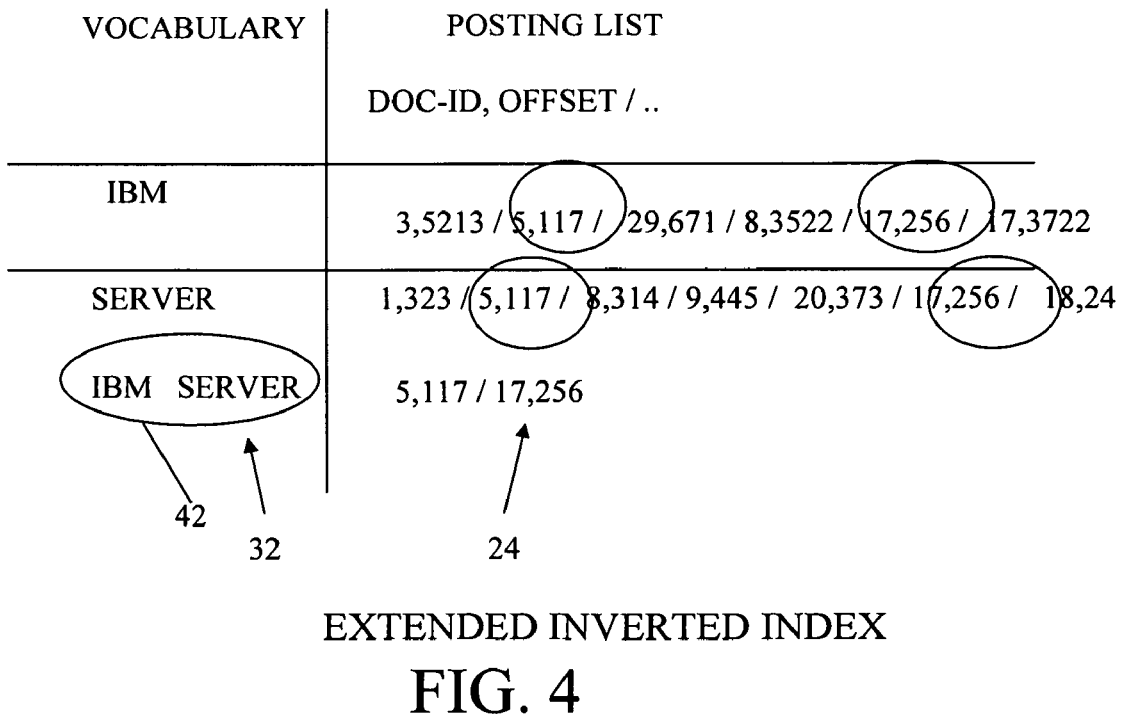
FIG. 4 is a schematic illustration according to FIG. 2, improved by an extended, inverted index according to a specific embodiment of the present invention.

In FIG. 4 a new entry provided by the present invention is denoted with reference sign 42. The content thereof is "IBM SERVER". The associated exemplary posting list comprises a first posting mentioning document ID 5, offset 117 and a further second document ID 17, offset 256. A comparison to the entries of "IBM" and that of "SERVER" shows that their posting lists are much longer. This results from more occurrences of each respective single term.

With further reference now to FIG. 5A the control flow of the novel embodiment during indexing time comprises a loop which is run through for each searched document. In this loop a first step 310 exists, in which the current document is scanned through with a 5-word window resulting in a word statistic comprising a plurality of words, i.e. search items with a respective score representing the absolute number of occurrences of an item within the scanned document, and a respective list of locations for each occurrence.

For example, in a scan window comprising a first word and subsequent four words only in forward direction, the occurrences of the 2-tuples of "IBM" "SERVER" is counted in the scan procedure.

Hypothetical sample occurrences comprising "IBM" as a potential search item are depicted as follows:

"IBM SERVER solutions are best rated . . . ";
"IBM mail SERVER was operated . . . ";
"IBM's sales statistics on SERVERs . . . ", etc.

All of them are found in the scan step 310. A score is incremented for each new occurrence of the Lexical Affinity "IBM . . . SERVER", and the location thereof in the document is stored for each occurrence in the posting list.

Each occurrence is counted only once for that score, as in a "moving" exemplary 5-word scan window, further occurrences exist, which include the text region preceding the sample text A), for example a part of the plain text section is:

"Over a time period of the last ten years IBM SERVER solutions are best rated."

Then, the following four occurrences are found and counted as a single hit:

1: last ten years IBM SERVER
2: ten years IBM SERVER solutions are
3: years IBM SERVER solutions
4: IBM SERVER solutions are best Next, in a step 320 the so-called noise is filtered according to prior art filter mechanisms in order to avoid that non-significant words like "is", "and", "are", "have", etc. form part of the novel extended index.

In a further step 330, the lexical affinities (LA) are generated. This is preferentially done as follows: in a first step 332 the single item top scorers are combined with each other. For example a document has a number of 10 content-significant single search items. Then the most top scorer item is sequentially combined with each respective subsequent single item from the top scorer list. In a second step 334 the document locations for each of both compared single items is compared. If, for example, the same document ID and an approximately identical offset is found, then the compared item pair can be found in the same line in the document and a close relationship can be stated. Thus, an occurrence counter for the pair is increased by 1. The method is continued until all locations of the search item pair have been processed. Then the number of total pair occurrences (LA occurrences) is stored along with each common location of the pair in the document. This procedure is continued for the next pair from the single item top scorer list.

Assume a case, in which the single items with the highest score are the following:

IBM, Environment, Server, Application, Integrated

At the end of step 336, when the lexical affinities according to the present invention have been determined, a top scorer lexical affinity list is created which could look as follows:

IBM ENVIRONMENT 190 OCCURRENCES, LOCATIONS: 4, 12; 6, 24; . . .
IBM SERVER 180 OCCURRENCES, LOCATIONS: . . .
IBM APPLICATION 160 OCCURRENCES, LOCATIONS: . . .
IBM INTEGRATED 120 OCCURRENCES, LOCATIONS: . . .

In a case, in which a number of 10 highest score single items are processed as described above the loop consisting of steps 332, 334 and 336 must be run (10*9): 2=45 times. (in general N)*(N−1):2.

It is admitted that this additional work means some additional computing required at indexing time. Then, finally in a step 340 the top most lexical affinities are inserted into the inverted index structure as it is depicted with entry 42 in FIG. 4 in an exemplary form.

The advantage resulting from this novel method is visible at query time, which is illustrated in FIG. 5B. FIG. 5B in his left part shows the prior art procedure including multiple usage of the bottleneck mentioned in the introductory chapter between CPU and memory and between memory and hard disk. At the right portion of FIG. 5B the novel method is presented: at first glance the novel method has less steps and uses this bottleneck much less than prior art.

According to the inventive embodiment only steps 350, 355 and 370 are performed. In particular in step 350 the information retrieval system receives a query comprising a lexical affinity (LA) as described before, for example "IBM . . . SERVER". The information system implementing the novel method resolves the LA item and looks up in a step 355 the extended inverted index provided by the present invention directly for the queried LA. In case the LA is found, the ranked posting list is then displayed to the user in a step 370. Step 355 implies a small number of disc I/O accesses in order to retrieve the posting list.

In comparison to that, FIG. 5B left portion shows what is done in prior art.

In step 450 a query is received comprising two different single items XX and YY and an AND operator which expresses that only documents should be result candidates which comprise both item XX and item YY. XX may be the item "IBM" and YY may be the item "SERVER".

Figure 1:
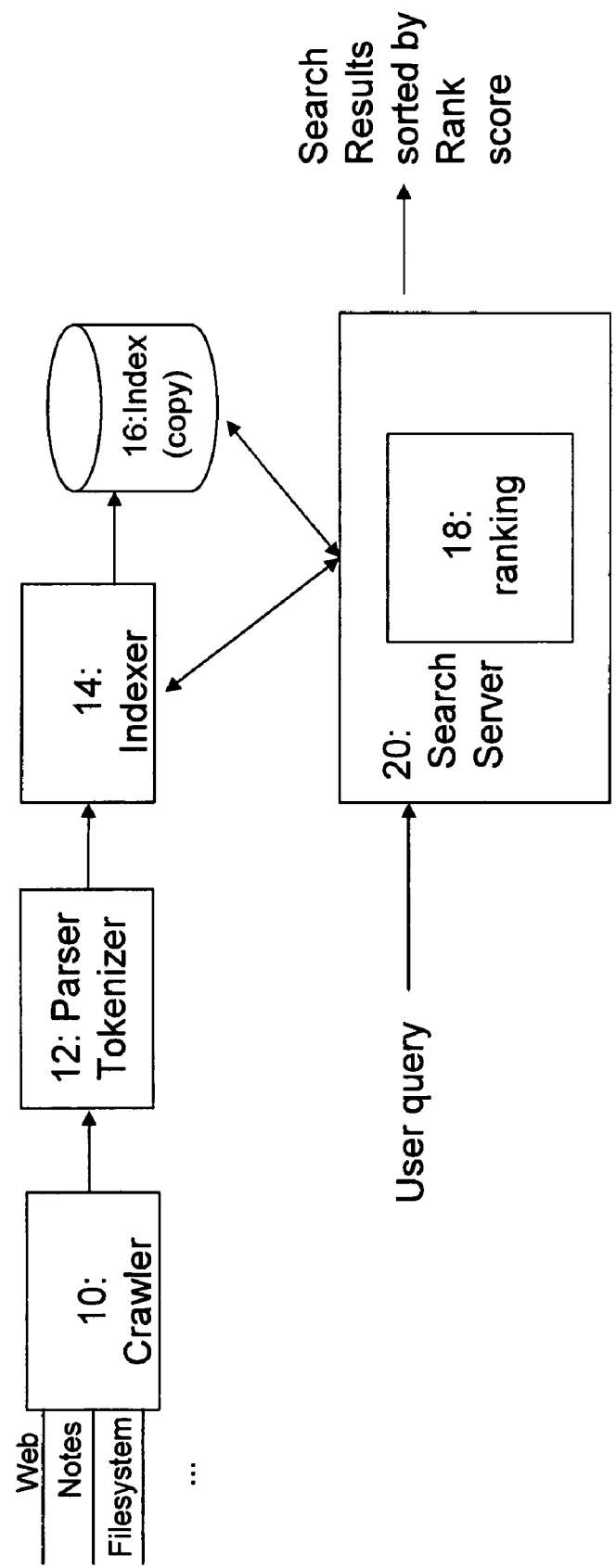
FIG. 1 is a schematic diagram illustrating a prior art information retrieval system.
Figure 2:
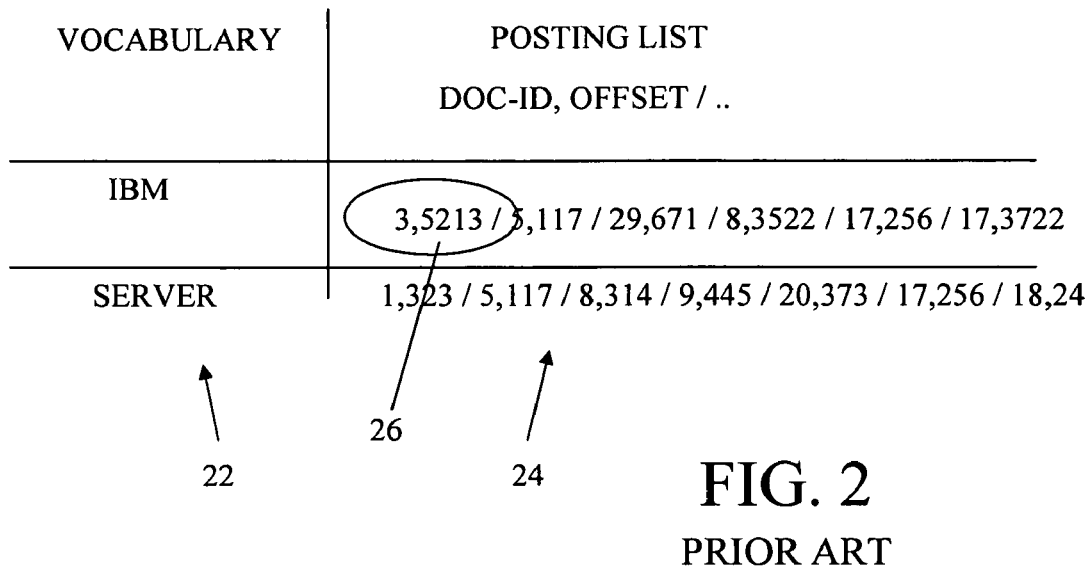
FIG. 2 is a schematic illustration of a prior art inverted index data structure section used during the search procedure of prior art IR systems.

Then in a next step 455 the inverted index structure shown in FIG. 2 is looked up for item XX. If found what is assumed in order to being able to compare the novel method to the prior art method, the posting list for XX will be read from disk. As the comparison in FIG. 4 shows, the posting list for XX will be in general case quite long compared to the posting list of an LA comprising XX and YY. Thus, in step 455, generally a much higher number of disk I/O accesses will be performed.

Then, in a step 460 the same is repeated for the item YY. Again a relatively high number of disk I/O accesses has to be expected.

Then in a further step 465 the AND operation will be performed in order to find out which subset of searched documents comprises both, search item XX and search item YY. When the posting lists are completely loaded from disk into memory then this step requires only "INCREASED CPU PROCESSING". This processing is also significant when compared to the small extend of processing which is required according to the invention. In rare cases where the posting list is too large for being stored completely in memory, then further disk I/O accesses are required for performing the logical AND operation.

Finally, in step 470 the ranked document list is also displayed to the user.

Figure 8:
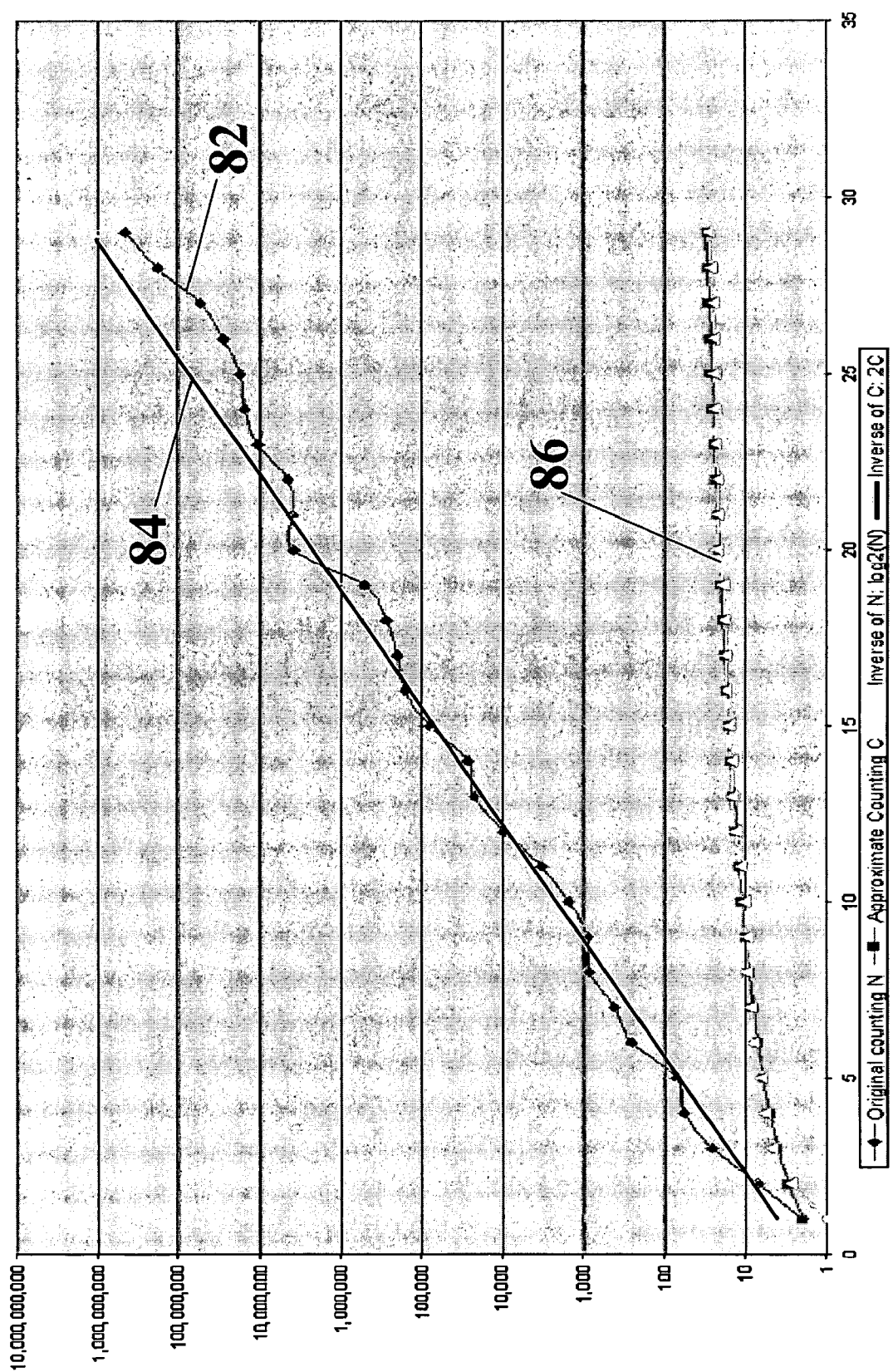
FIG. 8 is a graphical representation "original counting vs. approximate counting".

Next, the advantageous use of probabilistic counting (PC) will be further explained next below with further reference to FIGS. 6, 7 and 8.

As an exemplary use for the exploitation of probabilistic counting the computation of ranking of Lexical Affinities (LA) is disclosed in here. As already defined above, LAs are two-term correlations of words which co-occur within a specified distance, for instance five words. LA ranking can be computed by several statistical methods, which require the number of the term correlations as well as the number of each term a LA is comprised of.

Since the number of term correlations in huge text corpora may be very large, a large number of LA data items is identified in such cases, for instance up to several millions for more than 100,000 documents. Such a high amount of items can use an excessive amount of memory. Therefore it is mandatory to use a data type for counting that is able to efficiently store such a large number. Usually this data type is a 32 (64) bit unsigned integer type. The counting works in its easiest manner by incrementing the value by one, each time e.g. the LA occurs within a text corpus.

The probabilistic counting uses data types of much smaller size for counting.

According to the present invention, probabilistic counting can be used as a way to count large numbers 1 ... N using only $\log_2\log_2 N$ bits instead of $\log_2 N$ bits. This fact allows counting 32 bit integer values using only 5 bits. An exemplary implementation of the probabilistic counting is described below in C programming language:

```
void approxCnt(uint32_t * input) {
    if ( (*input)<=0 ) {
        (*input)=1;
    } else {
        double x = ((double)::rand( )/(double)(RAND_MAX));
        double x2 = 1.0-pow(2.0,(double)-(*input));
        if ( x >= x2 ) {
            (*input)++;
        } // end if
    } // end else
} // end approximateCount
```

The respective pseudo code algorithm steps are as follows:
Start with a counter C, which is initiated with 1
Use a pseudo random number generator to generate a floating point number x between 0 ... 1
Compare the generated number with the result of $1.0-(2^{-C})$ (=x2)
If x2 is smaller or equal than x, we increment C by 1, otherwise leave the counter at its old value As it can be seen from FIG. 6, the probabilistic counting algorithm increments its value with a probability that depends only on the number stored in its input value. The higher the number becomes, the lower will be the probability, that this value will be incremented. The table in FIG. 6 shows this probability of incrementation.

The following aspects should be noted when using the method of probabilistic counting in information retrieval systems:

The primary question of using probabilistic counting is how representative these counter values are. This question is answered in FIG. 8. Curve 86 shows the probabilistic counter, which is increased only very slowly, when the original counter is increased. The curve 84 represents the original count, whereas curve 82 is the inverse of the probabilistic counter value that can be used to retrieve the real number. The graphical representation of the differences between lines 82 and 84 shows clearly, that the error imported into a calculation fluctuates around the true value but remains quite limited. Besides the original counter 84 and the probabilistic counter, FIG. 8 shows the inversion of the probabilistic counter value 82 to retrieve an approximation to the real counter as well as the inversion of the real counter.

The novel use of the probabilistic counting has mainly two advantages. First it enables operating with smaller data structures. The use of smaller data structures results in a higher cache hit rate. When counting LAs using probabilistic counting the size of the data fields for counting can be reduced to one byte to count up to $2^{256}$ items. The second advantage is the decrease of the probability of incrementing the count. A result of this advantage is that the need to retrieve the LA data items per memory I/O for count manipulation will decrease, too. An even higher impact of this disk I/O saving can be recognized if it is necessary to write back the data items to memory, because each time the probabilistic counting decides that an increment is not necessary, the data items are left "untouched". This probability increases with every former increment of the value. The algorithm disclosed shortly above, will be of logarithmic complexity of processing the counter, while real counting may be assumed to be done usually in linear time.

The present invention can be realized in hardware, software, or a combination of hardware and software. An Information Retrieval tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. An electronic Information Retrieval (IR) method, comprising:
   generating an extended inverted index structure by:
      generating one or more lexical affinities, wherein each of the one or more lexical affinities comprises two or more search items found in proximity in one or more documents in a pool of documents by:
         sliding a scan window through each document in the pool of documents to identify search terms and a score for each search term representing an absolute number of occurrences of the search term;
         sequentially combining one search item being a most top scorer out of a group of content-significant single search items with each other search item in the group, wherein the one search item and the other search item form a pair; and
      for each pair,
         comparing document locations for each of the one search item and the other search item forming the pair;
         in response to determining that a same document ID and an approximately identical offset is found, determining that there is a close relationship between the one search item and the other search item forming the pair;
         incrementing a counter for each pair that has the close relationship with reference to a location of the one search item and the other search item in a same document from the pool of documents; and
         creating a top scorer lexical affinity list based on the counter for each pair; and generating a posting list for each of the one or more lexical affinities, wherein each posting list is associated with a specific lexical affinity and contains document identifying information for each of the one or more documents in the pool that contains the specific lexical affinity and a location within the document where the specific lexical affinity occurs.

2. The method according to claim 1, further comprising:
inserting the one or more lexical affinities into the extended inverted index structure, wherein the inserted one or more lexical affinities have top scores in the top scorer lexical affinities list.

3. The method according to claim 1, wherein the scan window is moved in a forward direction.

4. The method according to claim 1, wherein the scan window is moved in a backward direction.

5. The method according to claim 1, further comprising:
receiving a query that includes one lexical affinity from the one or more lexical affinities;
looking up the one lexical affinity in the extended inverted index structure; and
displaying a ranked document list for the one lexical affinity based on the posting list associated with the one lexical affinity.

6. The method according to claim 1, wherein query logs are used as information sources, and wherein the information sources are part of a predetermined pool of information sources that is crawled to create the extended inverted index structure.

7. The method according to claim 1, wherein anchor stores are used as information sources, and wherein the information sources are part of a predetermined pool of information sources that is crawled to create the extended inverted index structure.

8. The method according to claim 1, wherein probabilistic counting is used to count a number of occurrences of each of the one or more lexical affinities in the pool of documents at indexing time.

9. The method according to claim 1, further comprising:
ranking the pool of documents using the extended inverted index structure.

10. A computer system, comprising:
a storage means storing an extended inverted index, wherein the extended inverted index stores one or more lexical affinities, wherein each of the one or more lexical affinities comprises two or more search items found in proximity in one or more documents in a pool of documents;
means for generating the one or more lexical affinities by:
sliding a scan window through each document in the pool of documents to identify search terms and a score for each search term representing an absolute number of occurrences of the search term;
sequentially combining one search item being a most top scorer out of a group of content-significant single search items with each other search item in the group, wherein the one search item and the other search item form a pair; and
for each pair,
comparing document locations for each of the one search item and the other search item forming the pair;
in response to determining that a same document ID and an approximately identical offset is found, determining that there is a close relationship between the one search item and the other search item forming the pair;
incrementing a counter for each pair that has the close relationship with reference to a location of the one search item and the other search item in a same document from the pool of documents; and
creating a top scorer lexical affinity list based on the counter for each pair; and
means for storing a posting list for each of the one or more lexical affinities, wherein each posting list is associated with a specific lexical affinity and contains document identifying information for each of the one or more documents in the pool that contains the specific lexical affinity and a location within the document where the specific lexical affinity occurs.

11. The computer system according to claim 10, further comprising:
means for inserting the one or more lexical affinities into the extended inverted index structure, wherein the inserted one or more lexical affinities have top scores in the top scorer lexical affinities list.

12. The computer system according to claim 10, wherein the scan window is moved in a forward direction.

13. The computer system according to claim 10, wherein the scan window is moved in a backward direction.

14. The computer system according to claim 10, further comprising:
means for receiving a query that includes one lexical affinity from the one or more lexical affinities;
means for looking up the one lexical affinity in the extended inverted index structure; and
means for displaying a ranked document list for the one lexical affinity based on the posting list associated with the one lexical affinity.

15. The computer system according to claim 10, wherein query logs are used as information sources, and wherein the information sources are part of a predetermined pool of information sources that is crawled to create the extended inverted index structure.

16. The computer system according to claim 10, wherein anchor stores are used as information sources, and wherein the information sources are part of a predetermined pool of information sources that is crawled to create the extended inverted index structure.

17. The computer system according to claim 10, wherein probabilistic counting is used to count a number of occurrences of each of the one or more lexical affinities in the pool of documents at indexing time.

18. The computer system according to claim 10, further comprising:
means for ranking the pool of documents using the extended inverted index structure.

19. A computer program stored on a computer usable medium including instructions for performing an electronic Information Retrieval (IR) method, wherein the computer program when executed by a computer system causes the computer system to:
generate an extended inverted index structure by:
generating one or more lexical affinities, wherein each of the one or more lexical affinities comprises two or more search items found in proximity in one or more documents in a pool of documents by:
sliding a scan window through each document in the pool of documents to identify search terms and a score for each search term representing an absolute number of occurrences of the search term;
sequentially combining one search item being a most top scorer out of a group of content-significant single search items with each other search item in the group, wherein the one search item and the other search item form a pair; and for each pair, comparing document locations for each of the one search item and the other search item forming the pair;

in response to determining that a same document ID and an approximately identical offset is found, determining that there is a close relationship between the one search item and the other search item forming the pair;

incrementing a counter for each pair that has the close relationship with reference to a location of the one search item and the other search item in a same document from the pool of documents; and creating a top scorer lexical affinity list based on the counter for each pair; and generating a posting list for each of the one or more lexical affinities, wherein each posting list is associated with a specific lexical affinity and contains document identifying information for each of the one or more documents in the pool that contains the specific lexical affinity and a location within the document where the specific lexical affinity occurs.

20. A computer program product stored on a computer usable medium including a computer readable program, wherein the computer readable program when executed on a computer causes the computer to:

generate an extended inverted index structure by:

generating one or more lexical affinities, wherein each of the one or more lexical affinities comprises two or more search items found in proximity in one or more documents in a pool of documents by:

sliding a scan window through each document in the pool of documents to identify search terms and a score for each search term representing an absolute number of occurrences of the search term;

sequentially combining one search item being a most top scorer out of a group of content-significant single search items with each other search item in the group, wherein the one search item and the other search item form a pair; and for each pair, comparing document locations for each of the one search item and the other search item forming the pair;

in response to determining that a same document ID and an approximately identical offset is found, determining that there is a close relationship between the one search item and the other search item forming the pair;

incrementing a counter for each pair that has the close relationship with reference to a location of the one search item and the other search item in a same document from the pool of documents; and creating a top scorer lexical affinity list based on the counter for each pair; and generating a posting list for each of the one or more lexical affinities, wherein each posting list is associated with a specific lexical affinity and contains document identifying information for each of the one or more documents in the pool that contains the specific lexical affinity and a location within the document where the specific lexical affinity occurs.

21. The computer program product according to claim 20, wherein the computer readable program when executed on a computer causes the computer to:

insert the one or more lexical affinities into the extended inverted index structure, wherein the inserted one or more lexical affinities have top scores in the top scorer lexical affinities list.

22. The computer program product according to claim 20, wherein the scan window is moved in a forward direction.

23. The computer program product according to claim 20, wherein the scan window is moved in a backward direction.

24. The computer program product according to claim 20, wherein the computer readable program when executed on a computer causes the computer to:

receive a query that includes one lexical affinity from the one or more lexical affinities;

look up the one lexical affinity in the extended inverted index structure; and display a ranked document list for the one lexical affinity based on the posting list associated with that lexical affinity.

25. The computer program product according to claim 20, wherein query logs are used as information sources, and wherein the information sources are part of a predetermined pool of information sources that is crawled to create the extended inverted index structure.

26. The computer program product according to claim 20, wherein anchor stores are used as information sources, and wherein the information sources are part of a predetermined pool of information sources that is crawled to create the extended inverted index structure.

27. The computer program product according to claim 20, wherein probabilistic counting is used to count a number of occurrences of each of the one or more lexical affinities in the pool of documents at indexing time.

28. The computer program product according to claim 20, wherein the computer readable program when executed on a computer causes the computer to:

rank the pool of documents using the extended inverted index structure.

* * * * *